Aug. 13, 1968  A. BENDER  3,396,751
TWO-POSITION VALVE
Filed Oct. 18, 1966  2 Sheets-Sheet 1
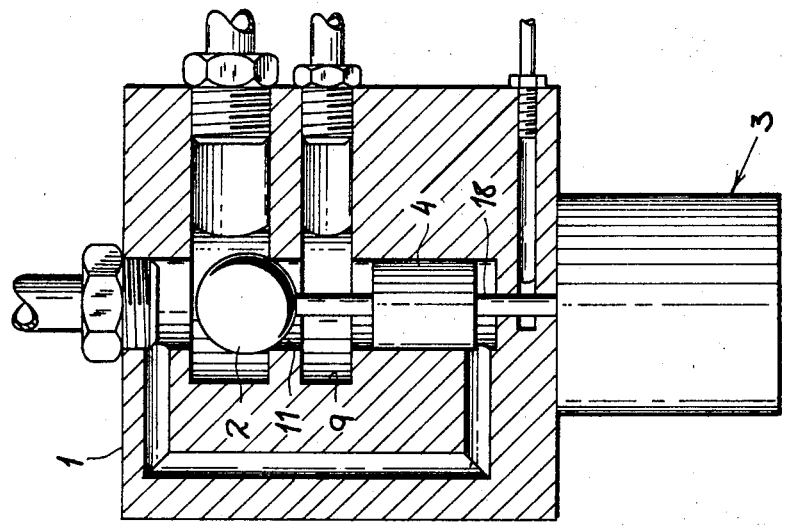
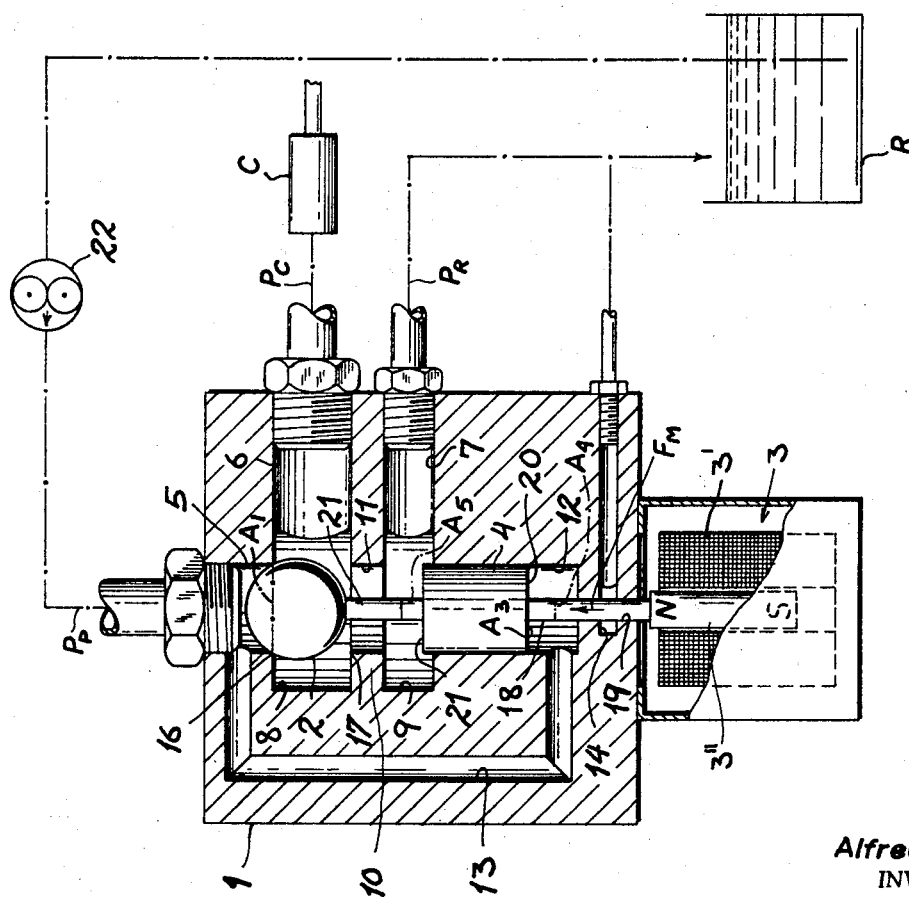
Alfred Bender
INVENTOR.
BY
Mestern, Ross & Mestern Alfred Bender
INVENTOR.

BY  Ross & Masters 3,396,751
TWO-POSITION VALVE
Alfred Bender, Hofheim, Taunus, Germany, assignor to Firma Alfred Teves, Frankfurt am Main, Germany, a corporation of Germany
Continuation-in-part of application Ser. No. 412,379, Nov. 19, 1964. This application Oct. 18, 1966, Ser. No. 598,566
Claims priority, application Germany, Nov. 27, 1963, T 25,137
7 Claims. (Cl. 137—625.65)

This application is a continuation-in-part of my application Ser. No. 412,379, filed Nov. 19, 1964, and now abandoned.

The present invention relates to two-position or so-called "two-pressure" valves for fluid-operable systems and, more particularly, to a valve of this character for hydraulic or pneumatic control systems.

Hydraulic or pneumatic control devices have, heretofore, been provided with control valves manually, remotely or automatically operable to cut off the flow of operating fluid from the source of fluid pressure to the fluid-responsive device and, generally, to connect this device to a reservoir or other storage means for the fluid. For the most part, such valves have been of the two-position type wherein a valve member is displaceable between a first position in which the source of fluid under pressure communicates with the fluid-operated device directly or via some force-amplifying or force-attenuating means, and a second position wherein the fluid-responsive device is discharged; when a hydraulic medium is employed, the liquid is returned through the valve to a reservoir from which the source of fluid pressure can be supplied. It has, moreover, been proposed to hold the valve member in one of its extreme positions by the fluid pressure at the valve and to employ an extraneous force (e.g., magnetic) for holding the valve member in its other extreme position. The disadvantages of such a system are obvious in that high fluid pressures and large flow apertures require correspondingly high extraneous forces if the valve member is to be held securely in its extreme position. Large forces of this character require correspondingly large permanent or electromagnet or other sources of force urging the valve member against the second seat.

It is, therefore, the principal object of the present invention to provide a two-position valve of the character described for the control of fluids under pressure whereby massive means for applying extraneous forces are not required.

Still another object of this invention is to provide a valve of the character described which is simple and of economical manufacture but wherein the valve member can be held securely in either of its extreme positions without the expenditure of large forces extraneous to the fluid system.

Another object is to extend the principles originally set forth in my copending application mentioned above.

These objects and others which will become apparent hereinafter are attained, in accordance with the present invention, by the provision of a two-position or two-pressure valve whose valve member is provided with differential-piston means having first and second effective surface areas exposed to fluid under pressure and at low pressure, respectively, and adapted to bias the valve member toward one of its extreme positions and against a first valve seat in blocking relationship therewith; the valve further comprises means for applying an extraneous force to the valve member in the direction in which the valve member is biased by the net fluid force applied to said different piston. The force-applying means thus acts in aiding relationship with the fluid force applied to one effective surface area and the sum of these forces at least balances the fluid force applied to the larger effective area of the valve member when the valve member is in blocking engagement with a second valve seat.

According to a more specific feature of the present invention, the force-applying means and the effective piston surfaces of the differential piston are aligned in the direction of displacement of the valve member and are preferably aligned therewith and with the first and second valve seats spaced apart in this direction. The valve seats should have, according to the principles of the present invention, approximately the same cross-sectional areas, these areas lying transversely to the direction of displacement of the valve member and the differential piston so as to expose effective surfaces of the valve member to fluid pressure in additive or subtractive relationship with the larger or smaller surfaces of the differential piston. Thus, the present invention contemplates the provision of a valve seat at a passage interconnecting a compartment of the valve communicating with the fluid-responsive or fluid-operated device and interconnecting the latter with, for example, a reservoir (in the event a hydraulic medium is employed) or the atmosphere (in the case of a gaseous fluid). The other valve seat is disposed between the source of fluid pressure and the aforementioned compartment in communication with the fluid-operated device (e.g., a hydraulic or pneumatic cylinder-and-piston arrangement, motor or the like) or with a further compartment communicating with the device.

Still another specific feature of this invention resides in the provision of a pressure chamber exposed to the pressure of a fluid as communicated through the passage along which the first valve seat is provided and formed with at least part of the larger effective area of the differential piston; another pressure chamber is formed between the differential piston and the force-applying means and communicates with the source of fluid under pressure at the valve inlet. The force-applying means is, according to this invention, constituted by a two-condition polarized magnet whose axially displaceable core or armature is composed of magnetic material and is affixed to the differential-piston and valve member. Any convenient solenoid-type coil can be employed as the magnet means although it is also possible to make use of permanent magnet systems displaceable into the proximity of the core.

In a preferred embodiment of the invention, the valve member is a ball to which a piston is secured, the high pressure of the source acting in opposite directions upon the valve member and the differential piston. Thus the latter may have its full surface area exposed to the fluid pressure of the outlet (in the blocked condition of the inlet) while source pressure acts upon the valve member to urge it away from its seat and upon the piston in the opposite direction. The piston has, in accordance with this phase of the invention, a surface area equal to that of the valve member exposed to source pressure and likewise exposed to source pressure while being effective to hold (with the aid of the bistable or reversible polarized magnet) the valve member in its inlet-blocking position. When the holding force of the magnet is released, however, the valve member may move only under the effect of fluid pressure to connect the source with the load and block communication between the latter and the outlet. Since the larger face of the differential piston is exposed to the discharge or back pressure and source pressure continues to be applied to the equal but oppositely effective surfaces of the valve member and differential piston, the differential action serves to open the valve.

The above and other objects, features and advantages of the present invention will become more readily apparent from the following description, reference being made to the accompanying drawing in which:

FIG. 1 is a vertical cross-sectional view through a two-position valve, according to the present invention, in one of its operative positions;

FIG. 2 is a view similar to FIG. 1 showing the valve in its other extreme position.

Figure 4:
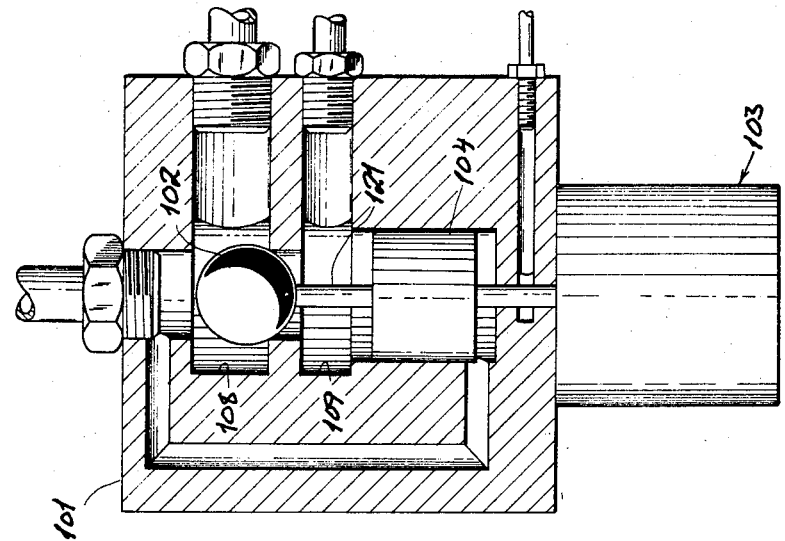
FIGS. 3 and 4 are views similar to FIGS. 1 and 2 showing another valve assembly.

In the drawing I show a valve housing 1 in which a valve body 2 is reciprocable between its upper position in which it engages the annular valve seat 16 and its lower position of engagement with a valve seat 17 of similar cross-sectional area. The valve member 2 is connected by a rod 21 with a differential piston 4, while this piston has a shaft 18 guided in the bore 19 of the housing and forming the movable core of an annular magnet 3. An inlet 5 of the valve housing 1 is supplied with fluid under pressure from a pump 22 which draws the hydraulic medium from a reservoir R. The valve seat 16 is interposed between the inlet 5 and a port 6 supplying hydraulic fluid to a fluid-responsive or fluid-operated device, such as the hydraulic working cylinder C. The port or passage 6 communicates with the chamber 8 in which the spherical valve body 2 is displaceable and separates this chamber from the chamber 9 to which the effective surface 21 of the piston 4 is exposed. The seat 17 thus surrounds a passage 11 in the partition 10 between the compartments 8 and 9. A duct 7 connects compartment 9 with the reservoir R in the return path for the hydraulic medium. At the other end of differential piston 4, the valve housing is provided with a chamber 12 which is maintained at the supply pressure of inlet 5 via duct 13. An annular leakage compartment 14 is interposed between the chamber 12 and the exterior along the shaft 18 and its bore 19 to accumulate oil tending to leak under pressure along the shaft 18 and return it to the reservoir.

As previously noted, the valve body 2 is constituted substantially as a sphere or ball so that the annular valve seats 16 and 17, which have relatively large cross-sections, define the same effective areas with respect to fluid pressure applied to the valve member. It is evident that the fluid pressure applied to a ball is effective over the area exposed to the fluid and projected on a plane perpendicular to the direction of movement of the piston. When the valve member 2 is in all around engagement with the seat 16 and blocks communication of fluid from the inlet 6 to the working cylinder C via chamber 8 and passage 6, the cylinder C communicates via the passage 6, the chamber 8, the unblocked valve seat 17, the passage 11, the chamber 9 and the passage 7 with the reservoir to de-energize the cylinder. When, however, the valve member 2 engages valve seat 17 in blocking position, hydraulic medium can flow from the pump 22 via inlet 5, chamber 8 and passage 6 to the working cylinder, the return stream to reservoir R being terminated.

The effect of the differential piston, as will be evident hereinafter, is to reduce the force which must be applied to the extraneous means (i.e., the electromagnet 3) to shift the valve member from one of its operative positions to the other. Thus, when the valve body 2 and differential piston 4, both of which constitute the valve member, are in the position shown in FIG. 1, the pressure $P_p$ of pump 22 is effective over the cross-sectional area $A_1$ of the valve seat 16 to urge the valve body 2 downwardly. The surface 21 of differential piston 4, whose area will be denoted as $A_2$, is at the pressure $P_r$ of the reservoir or, as the cylinder C discharges, at the pressure $P_c$ of the fluid from the cylinder passing through chamber 9 to the reservoir. The oppositely effective surface 20 of piston 4 has its area $A_3$ exposed to the pump pressure $P_p$ via duct 13. The cross-sectional area of shaft 18 will be designated as $A_4$ for the present purposes. In order for the valve body 2 to be held securely against the valve seat 16 in the position shown in FIG. 1, a force $F_m$ must be applied by the polarized magnet 3 to the shaft 18 which is equal to or just slightly greater than the produce $P_p \times A_4$.

This relationship is readily discernible since the force acting upon the valve body to hold it against the seat 16 is the sum $P_p \times A_3 + F_m + P_c \times (A_1 - A_5)$ while the force acting in the opposite direction is the sum $$P_p \times A_1 + P_c \times A_2$$

For the sake of this discussion, $P_c$ can be considered equal to $P_r$ and both equal to 0. If the diameters of areas $A_1$ and $A_3$ are assumed to be equal, it will be evident that the force $F_m$ would have to be at least equal to $P_p \times A_4$. This can be seen in a simplified manner by noting that the pressure of the fluid from the cylinder is applied to similar areas of the ball-shaped valve body 2 and the piston member 4 except that it is less effective in the direction of seat 16 by virtue of the presence of shaft 18. This difference in the effectiveness of the fluid pressure is supplied by the magnetic means. The two-condition magnet means can be any convenient solenoid arrangement as disclosed, for example, in commonly assigned copending application Ser. No. 327,198, filed Dec. 2, 1963, by myself and others, now Patent No. 3,305,209. In a simplified form, the magnet is seen to include a solenoid coil 3' which is energizable from a D.C. source and a polarized core 3" mounted on or integral with the shaft 18. With the system in the position shown in FIG. 1, the cylinder C discharges fluid into the reservoir R. The force $F_m$ of the magnet acts in aiding relationship with the pressure in chamber 12 and thus can be relatively weak. In fact, since the pressure in chamber 12 is always equal to that supplied by the pump, the valve can control substantially any pressure with substantially the same magnetic force although the pistons may be higher or lower in accordance with the requirements of this system. It may be observed that seldom, if ever, is the pressure of fluid discharged from the cylinder and applied to surface 21 greater than that applied to the pump, since chamber 9 is in permanent connection with the outlet 7.

When the magnet is de-energized or preferably reversed with the valve member 2, 4 moving in the direction of the valve seat 17, the passage 11 is blocked so that the working cylinder C is supplied with fluid from the inlet 5 at the pump pressure $P_p$. The magnet is now forceless in preparation for energization to block the influx of the hydraulic medium. The force holding the member against the seat is now $P_p \times A_1 - P_p \times A_3$. Thus, only the relatively weak force $F_m$ is required to counter the pump pressure and drive the valve body 2 into engagement with the seat 16 when the magnet 3 is re-energized.

Figure 3:
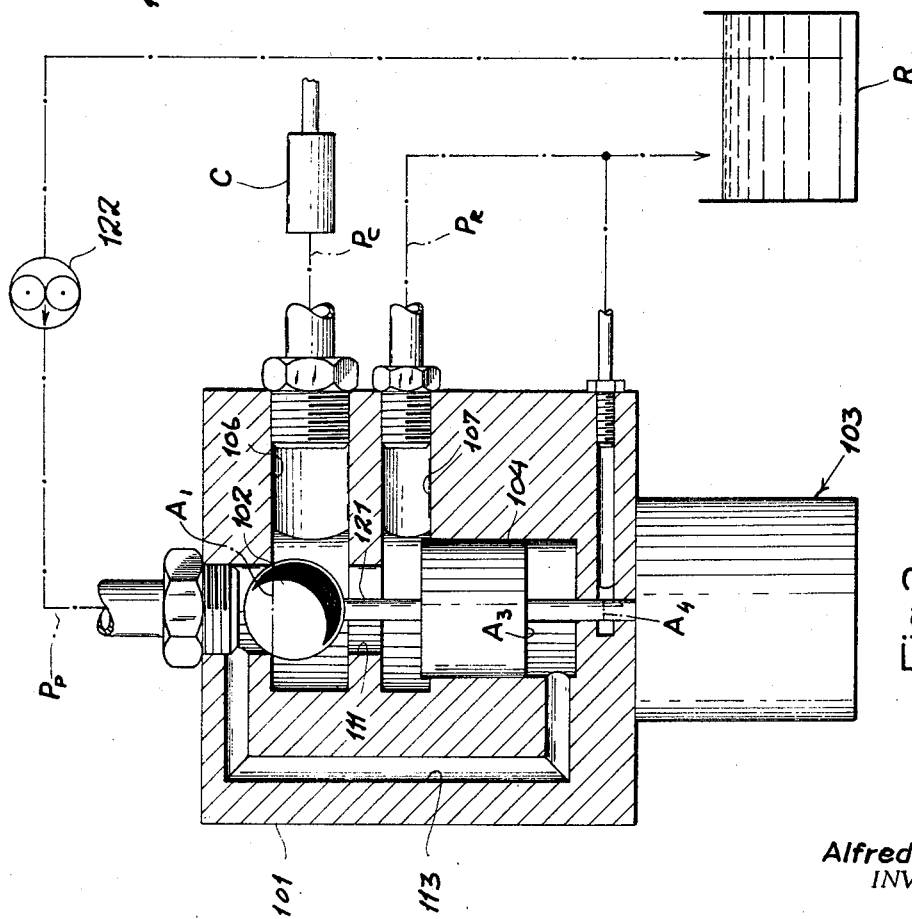

According to an important aspect of this invention, the valve is shifted with a magnet of small dimension. The ball valve 102 is thus held in its upper position (FIG. 3) in part by the pressure applied to the surface 120 which, in this case, has the same surface area as that represented at $A_1$. The valve is thus held closed partly by magnetic force and is shifted automatically (i.e., exclusively by fluid pressure). In FIGS. 3 and 4, the parts corresponding to those of FIGS. 1 and 2 are identified with similar reference numerals in the "hundreds" range.

The force relationships involved in this system will be apparent from the following equations. If the pressures are represented as previously given, with $P_p$ indicatng the pressure at the inlet 105, $P_c$ the pressure at the outlet 106 to the hydraulic motor, $P_r$ the pressure at the outlet 107, and $F_m$ the magnetic holding force (as applied by the magnet 103), the following equations can be stated:

$$F_m \geq A_1 \times P_p - A_1 \times P_c - A_3 \times P_p + A_2 \times P_c$$

Thus:

$$F_m \geq \text{ to } P_p(A_1 - A_3) + P_c(A_2 - A_1)$$

Since:

$$A_1 = A_3$$

and $$A_2 = A_4 + A_3 = A_1 + A_4$$

the following relationships can be discerned:

$$F_m \geq P_p(A_1 - A_1) + P_c(A_1 + A_4 - A_1)$$

or $$F_m - \geq P_c \times A_4$$

When the stem or rod 118 of the magnetic device 103 has a diameter of 4 mm., and the return or back pressure $P_r$ at the outlet 107 is approximately 10 kp./cm.² (a back pressure close to that prevalent in most high-pressure hydraulic systems), the magnetic holding force $F_m$ is approximately equal to 1.26 kp. This holding force is easily supplied by even conventional light-weight and compact polarized reversing magnets.

The traction force which must be exerted to open the valve and permit communication between the inlet 105 and the outlet 106 to the hydraulic motor can be computed as follows ($F_{mt}$ being designated as the traction force exerted by the magnet to shift the valve):

$$F_{mt} \geq P_p \times A_3 - P_r \times A_2 + P_r \times A_1 - P_p \times A_1$$

$$F_{mt} \geq P_p(A_3 - A_1) + P_r(A_1 - A_2)$$

$$A_1 = A_2 - A_4$$

$$F_{mt} \geq 0 + P_r(A_2 - A_4 - A_2)$$

or $$F_{mt} \geq -P_r \times A_4$$

Consequently, under the same operating conditions as discussed above (back pressure of 10 kp./cm.² and a rod diameter of 4 mm.), a traction of −1.26 kp. is required to open the valve. This of course means that, upon removal of the magnetic holding force, e.g., de-energization of the magnet, both the magnet core and the valve member will shift into the other position (FIG. 4) to connect the inlet 105 with the load via outlet 106 only under the action of the fluid.

The invention as described and illustrated is believed to admit of many modifications within the ability of persons skilled in the art; such modifications are considered to fall within the spirit and scope of the appended claims.

I claim:

1. A two-position valve for the control of a fluid under pressure, comprising a valve housing provided with an inlet for fluid under pressure, a port for supplying fluid to a fluid-responsive device, an outlet for discharging fluid at low pressure from said housing, a first passage interconnecting said inlet and said port, and a second passage interconnecting said port and said outlet; means in said housing forming a pair of spaced-apart valve seats, each along a respective one of said passages; a valve member reciprocably displaceable within said housing between a first position in blocking engagement with a respective valve seat and closing said first passage while permitting fluid flow from said port to said outlet through said second passage, and a second position wherein said member is in blocking engagement with the other of said seats to close said second passage and permit fluid flow from said inlet to said port; two-condition magnetic force-applying means operatively connected with said valve member for displacing it from one of said positions to the other in one operative condition of said force-applying means and permitting displacement of said valve member from said other position to said one of said positions in a second operative condition of said force-applying means; and differential-piston means on said valve member having a first effective surface exposed to fluid pressure applied by said source at said inlet and a second surface effective in a direction opposite to that of said first surface and exposed to the pressure of fluid at said outlet whereby said valve member is displaceable solely by fluid pressure and the action of said magnetic force-applying means between said positions.

2. A valve as defined in claim 1 wherein said valve member is linearly displaceable in said housing between said positions and said valve seats are aligned with said valve member but are spaced apart in the direction of reciprocation thereof, said magnetic force-applying means having an armature aligned with said valve member and affixed thereto remote from said valve seats.

3. A valve as defined in claim 2 wherein said first and second surfaces of said differential-piston means are spaced along said valve member in said direction between said armature and said valve seats.

4. A valve as defined in claim 3 wherein said valve body has a surface area exposed to the fluid pressure at said inlet equal to that of said first surface of said differential piston and effective in the opposite direction, said first surface being effective to urge said body into blocking engagement with said valve seat of said first passage.

5. A valve as defined in claim 3 wherein said valve seats have identical cross-sectional areas and said valve member includes a valve body rigid with said differential piston means and disposed between said valve seats for selective engagement therewith.

6. A valve as defined in claim 5 wherein said valve body is generally spheroidal and is connected with said differential piston means by an axially extending rod.

7. A valve as defined in claim 5 wherein said valve housing is formed with a first chamber surrounding said valve member remote from said valve seats and at least partly defined by said first chamber, and duct means formed in said housing communicating between said inlet and said first chamber to apply fluid under pressure to said first surface, said housing further being formed with a second chamber between said differential-piston means and said valve body communicating with said outlet and at least partly defined by said second surface for maintaining a low pressure at said second surface, said second passage communicating with said second chamber.

References Cited

UNITED STATES PATENTS

| | | | |
|---|---|---|---|
| 2,723,681 | 11/1955 | MacGlashan et al. | 137—625.65 |
| 2,895,089 | 7/1959 | Leber | 137—625.65 XR |
| 2,930,404 | 3/1960 | Kowalski et al. | 137—625.65 |

FOREIGN PATENTS

| | | |
|---|---|---|
| 420,762 | 3/1967 | Switzerland. |
| 842,238 | 7/1960 | Great Britain. |
| 1,193,775 | 3/1958 | France. |
| 1,270,822 | 9/1960 | France. |

M. CARY NELSON, *Primary Examiner.*

R. J. MILLER, *Assistant Examiner.*